J. W. CORDES.
GLASS CASTING TABLE.
APPLICATION FILED NOV. 20, 1914.
1,207,867.
Patented Dec. 12, 1916.
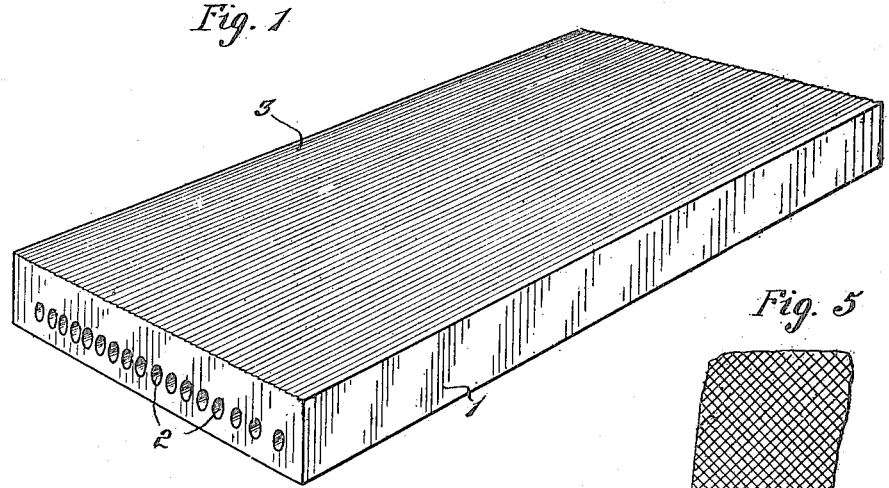
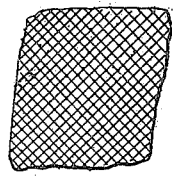
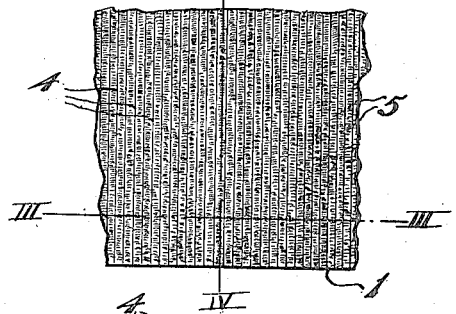
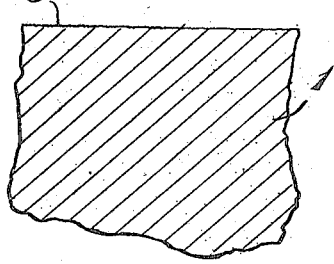
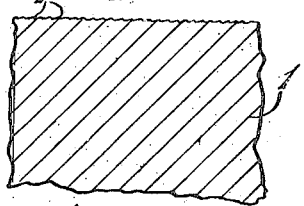
INVENTOR.
John W. Cordes

UNITED STATES PATENT OFFICE.

JOHN W. CORDES, OF PITTSBURGH, PENNSYLVANIA, ASSIGNOR TO PITTSBURGH PLATE GLASS COMPANY, OF PITTSBURGH, PENNSYLVANIA, A CORPORATION OF PENNSYLVANIA.

GLASS-CASTING TABLE.

1,207,867.      Specification of Letters Patent.      Patented Dec. 12, 1916.

Application filed November 20, 1914. Serial No. 873,082.

*To all whom it may concern:*

Be it known that I, JOHN W. CORDES, a citizen of the United States, residing at Pittsburgh, in the county of Allegheny and State of Pennsylvania, have invented a certain new and useful Glass-Casting Table, of which the following is a specification.

The invention relates to tables for use in the making of plate glass. It has for its primary objects; the provision of a table surfaced so that the rapidity of heat transference from the glass to the table is reduced; and the provision of a water cooled table which can be used without sand or similar substances. Certain embodiments of the invention are illustrated in the accompanying drawings, wherein—

Figure 1 is a perspective view of a fragmentary portion of the casting table embodying my invention, Fig. 2 is a partial plan view of the surface of the table magnified to show its roughness, Fig. 3 is a section on the line III—III of Fig. 2, Fig. 4 is a section on the line IV—IV of Fig. 2, and Fig. 5 is a diagrammatic plan view of a portion of a table having a modified type of roughening.

The present method of casting plate glass involves the use of leers at the ends of the casting tables to receive the sheets of glass after the casting operation, and as a result, the glass is always poured upon the same end of any particular table, that is, upon the end of the table remote from the leer. Repeated use of the table tends to cause an overheating thereof, especially at the end which receives the molten glass, and as a result the table will lift and warp and adherence of the glass to the table will occur unless means are provided to prevent it. The prevention of this overheating of the tables has been accomplished by water cooling, but this water cooling, because of the rapid transference of the heat of the glass to the surface of the table, tends to produce fine cracks, called "pin cracks," in the surface of the glass in contact with the metal. To avoid this difficulty and reduce the rapidity of cooling at the surface of the glass, a thin layer of sand has been used upon the table, and in this manner the table is not only prevented from overheating, but the "pin cracks" in the surface of the glass are avoided. The use of the sand, however, is subject to a disadvantage that its use necessarily roughens the face of the sheet of glass to which it sticks so that more grinding is required than would otherwise be necessary if a smooth surface were used without sand, and because of this excessive grinding a thicker sheet of glass must be cast. Also the presence of the particles of sand adhering to the surface presents certain objections in the handling of the glass by the modern methods by means of clamps as the grains embed themselves in the face of the clamps and it is necessary to grind the sand side first, which has also certain objections. A further disadvantage incident to the use of the sand, is the rapid wearing away of the surface of the tables and the bottoms of the leer ovens, due to the abrasive action which occurs when the sheet of glass is slid across the table and into the leer.

My invention is designed to overcome the difficulties as above stated with respect to the use of sand or of a similar material, and is directed to the feature of so surfacing the casting table that the rapidity of heat transference from the glass to the table is reduced without the use of sand, thus permitting at the same time of the use of the water cooling feature, which prevents the table from warping or becoming overheated. Briefly stated, I accomplish this result by very finely roughening the surface of the table, thus producing a multitude of minute depressions of such smallness that the glass is substantially excluded therefrom, such exclusion being largely due, I believe, to the presence of air entrapped in the depressions. The area of contact between the glass and the metal is thus very largely reduced and as a result the rapidity of heat transference from the glass to the metal is greatly reduced. As a result the table may be so water cooled that it will not warp or overheat, and at the same time any cracking of the glass due to the too rapid cooling of its surface is avoided. The use of sand is thus avoided, and a substantially smooth surface upon the glass is secured since the roughening of the surface of the table does not result in the roughening of the surface of the glass. The securing of a smooth surface of the glass is further helped by the use of a thin coating of plumbago upon the surface of the table, such plumbago filling in the depressions and rendering the surface of the table substantially smooth. The use of plumbago (which is not broadly new upon casting tables since it had been heretofore used to polish tables with smooth surfaces prior to the advent of water cooled tables) is further advantageous in that the friction between the sheet of glass and the table is reduced rendering it easy to slide the glass off of the table and into the leer after the casting operation.

Referring to Figure 1 of the drawings, 1 is the table of cast iron or cast steel provided with the passages 2 for the water employed in cooling the table. The metal employed is preferably of a coarse porous texture, having less conductivity than metal of greater density and finer texture, and is more readily roughened in the machining operation as hereafter described than is the case with a more dense and finer grained metal. The glass receiving surface 3 of the table is very finely roughened. This is preferably accomplished in the machining operation upon a planer. The tool employed in machining the surface, is given a feed which is heavier than normal and as a result the tool does not cut smoothly, but to a certain extent tears off the ribbon of metal, leaving the surface machined finely roughened with minute transverse grooves or depressions, such action being well known to machinists and characteristic of the taking of an unduly heavy cut either upon a planer or lathe the cells resulting being larger than the holes leading to them which forms an ideal surface to hold the air or unguent, as hereafter described, imprisoned. The character of the surface secured is indicated graphically in Fig. 2, the parallel lines 4 indicating the lines of travel of the edges of the tool, and the fine transverse lines of relatively short length indicating the depressions due to the tearing action of the tool upon the metal. As indicated at 5 in Fig. 4, the small transverse grooves are very minute and closely spaced, while as indicated at 4 in Fig. 3 the grooves between the lines 4 (Fig. 2) are larger and more uniform. It will be seen that the roughening effect as secured by the machining operation, is a very fine one, the depressions being so minute as to hold a quantity of air and exclude the molten glass, without perceptibly roughening the surface of the glass.

The method above described for securing the roughened surface upon the table is only one of many which might be employed and coming within the scope of the invention, such method, however, being preferred because of the ease with which the roughening is secured and because the surface secured is perfectly suited to obtain the desired results. A more regular roughening of the surface might be secured by knurling or by planing roughly first in one direction and then transversely as indicated in Fig. 5. The invention of course has its greatest utility in a water cooled casting table, but might be used to advantage with tables of other types where it is desirable that the rapidity of heat transference be reduced to a minimum. As heretofore indicated, plumbago is preferably used to make the surface of the table smoother, but under certain conditions it may be dispensed with, or other unguent, relatively non-conducting materials, may be employed in place of the plumbago, such as graphite, red oxid of iron, or the like. I have found by the use of this table that a relatively smooth sheet of glass may be cast upon a water cooled table without the cracking of the surface of the glass, such sheet being thinner and requiring less grinding than is possible by the use of a similar table but employing sand in place of the roughened surface. I have also found that the table is more durable than in the case where sand is employed and that the sheet may be more easily slid off of the table into the leer than is the case with the standard table wherein the sand resists the movement of the sheet of glass and tends to wear the table. Other advantages incident to the construction will be readily apparent to those skilled in the art.

What I claim is:

1. A casting table having a metal glass receiving surface roughened with a degree of fineness such as to reduce the area of contact between the glass and metal while at the same time giving a substantially smooth surface to the glass cast upon the surface.

2. A water cooled casting table of metal having its glass receiving surface roughened with a degree of fineness such as to reduce the area of contact between the glass and metal while at the same time giving a substantially smooth surface to the glass cast upon the surface.

3. A casting table of metal having a metal glass receiving surface substantially plain but covered with minute depressions of such smallness that the molten glass is substantially excluded therefrom.

4. A casting table of metal having its glass receiving surface finely roughened so as to provide minute depressions and projections, and a coating of unguent relatively refractory material on the said surface filling the said depressions and rendering such surface smooth.

5. A water cooled casting table of metal having its glass receiving surface substantially plain but covered with minute depressions of such smallness that the molten glass is substantially excluded therefrom.

6. A water cooled casting table of metal having its glass receiving surface finely roughened so as to provide minute depressions and projections, and a coating of unguent relatively refractory material on the said surface filling the said depressions and rendering such surface smooth.

7. A casting table of metal having a coarse porous texture and provided with a glass receiving surface finely roughened so as to provide minute depressions and projections, and a coating of unguent relatively refracting material on the said surface filling the said depressions and rendering such surface smooth.

8. A casting table of metal having its glass receiving surface machined with a tool fed to a cut of such heaviness that the metal is partially torn off leaving the surface substantially plain but finely and irregularly roughened due to the tearing action.

In testimony whereof I have hereunto signed my name in the presence of the two subscribed witnesses.

JOHN W. CORDES.

Witnesses:
CARL S. LAMB,
WM. J. PERTZ.